United States Patent Office 3,247,119
Patented Apr. 19, 1966

3,247,119
CLEANSING COMPOSITION AND THICKENER
THEREFOR
Aaron B. Herrick and Eric Jungermann, La Grange, Ill., and Jesse Arriaga, Tulsa, Okla., assignors to Armour and Company, Chicago, Ill., a corporation of Delaware
No Drawing. Filed Feb. 6, 1962, Ser. No. 171,345
2 Claims. (Cl. 252—106)

This invention relates to a cleansing composition and thickener therefor, and more particularly to a cleansing composition which has bactericidal, fungicidal, and fungistatic properties, and to a thickener therefor.

Cleansing compositions for industrial, domestic, and other uses usually require viscosity-increasing agents. For example, heavy-duty detergents, waterless hand cleansers, creams, ointments, shampoos, and the like require a thickening agent to maintain the suspension. When the composition includes a germicide, it is almost impossible to thicken the cleansing fluid and obtain a stable product without inhibiting the germicidal properties of the formulation. By increasing the amount of the thickening agent, it is found that the germicidal properties theretofore present in the formulation are decreased.

We have found that by adding a quaternary thickening compound to a modified amide thickener, the loss in bactericidal activity normally encountered with the use of amide thickeners is inhibited. The combination of thickeners also increases the upper cloud point of germicidal cleansing fluids containing non-ionic detergents.

A primary object, therefore, of the present invention is to provide in a cleansing compound, a thickening component material which may be added to any desired extent without substantially inhibiting the germicidal property of the formulation. Yet another object is to provide a cleansing composition having bactericidal, fungicidal, and fungistatic properties and which has the desired viscosity and germicidal properties. A further object is to provide a method for producing a cleansing composition having germicidal properties, great stability at elevated storage temperature, and which is thickened to the desired viscosity for the product use. Other specific objects and advantages will appear as the specification proceeds.

In one embodiment of the invention, a cleansing material and a germicidal quaternary ammonium compound are mixed with water and then mixed with a long-chain quaternary ammonium salt and a polyethenoxydiethanolamide, and the mixture is continued preferably until the solution is clear.

If desired, sodium carbonate, sodium bicarbonate and tripolyphosphate may be added to the water solution.

In the foregoing preparation, the combination of modified amide and quaternary thickening compound may be added in any desired amount to give the viscosity required for the product use, without any substantial loss of germicidal property in the formation.

The germicidal quaternary ammonium compound may be any of the quaternary ammonium compounds available for their germicidal properties. Well-known examples of such quaternaries are n-alkyl ($C_{14}$, $C_{12}$, $C_{16}$) dimethyl benzyl ammonium chloride; alkyl ($C_{14}$, $C_{18}$, $C_{12}$, $C_{16}$ and related groups $C_8$ and $C_{10}$) dimethyl benzyl ammonium chlorides; alkyl ($C_{12}$, $C_{14}$, $C_{16}$ and related groups from $C_8$ to $C_{18}$) dimethyl dichlorobenzyl ammonium chlorides; n-alkyl (60% $C_{14}$, 30% $C_{16}$, 5% $C_{12}$, 5% $C_{18}$) dimethyl benzyl ammonium chloride; and n-alkyl (50% $C_{12}$, 30% $C_{14}$, 17% $C_{16}$, 3% $C_{18}$) dimethyl ethylbenzyl ammonium chloride.

We prefer to employ a germicidal product which is commercially available under the name Onyx BTC 2125. This product comprises 25% of n-alkyl dimethyl benzyl ammonium chloride, 25% of n-alkyl dimethyl ethylbenzyl ammonium chloride, and 50% water.

Any suitable non-ionic detergent may be employed, and since these are well known a detailed listing thereof is believed to be unnecessary. We prefer to employ nonylphenol polyethenoxyethanol.

The thickening composition comprises preferably a long-chain quaternary ammonium salt, such as, for example, dodecylbenzyl octadecyl dimethyl ammonium chloride. The long-chain quaternary ammonium salts may be designated as the dodecylbenzyl chloride quaternary of N,N-dimethyloctadecylamine, the dodecenyl chloride quaternary of N,N-dimethyloctadecylamine, the propargyl chloride quaternary of N-methyl-N,N di-(hydrogenated tallow)amine, the dodecenyl chloride quaternary of N,N-dimethyldodecylamine, and the dodecylbenzyl chloride quaternary of N-tallow tris-(hydroxyethyl)-trimethylenediamine. The amount of the long-chain quaternary ammonium salt which is added to the water-containing liquid to thicken the latter will depend upon the degree of viscosity desired for the finished product. The more of the long-chain quaternary ammonium salt that is added, the thicker will be the finished product and vice versa. The long-chain quaternary ammonium salts utilized in our invention may be produced substantially as disclosed in "Encyclopedia of Chemical Technology," Interscience Encyclopedia, Inc., New York (1953), vol. 11, pages 375–379.

As already stated, sodium salts may be employed, such as sodium carbonate or bicarbonate, sodium tripolyphosphate. Further, it will be understood that coloring materials may be added.

Specific examples illustrative of the composition and method of preparing it may be set out as follows:

Example 1

A germicidal cleansing fluid suitable for use on floors, walls, furniture, etc. has the following compositions:

| | Percent |
|---|---|
| Onyx BTC 2121 (n-alkyl dimethyl benzyl ammonium chloride 25%, n-alkyl dimethyl ethylbenzyl ammonium chloride 25%, water 50%) | 10.00 |
| Nonylphenol polyethenoxyethanol | 4.50 |
| Polyethenoxy diethanolamide of coconut fatty acids | 2.00 |
| Dodecylbenzyl octadecyl dimethyl ammonium chloride 75%, water 25% | 1.00 |
| Sodium carbonate | 3.00 |
| Sodium tripolyphosphate | 2.00 |
| Color (Rhodamine) 1% | 0.25 |
| Water | 77.25 |
| | 100.00 |

The foregoing composition has a phenol coefficient for *Staphylococcus aureus* 25 and for *Salmonella typhosa* 14. It has excellent stability at 40°, 70° and 130° F. After 30 days at 130° F., there was no reduction in the phenol coefficient. The viscosity was 23 cps. (Brookfield).

In preparation of the composition, the water was heated in a steel mixing tank to 80° F., and the sodium carbonate and sodium bicarbonate added and agitated until dissolved. Powdered sodium tripolyphosphate was dissolved in water and added to the solution of sodium carbonate and sodium bicarbonate. The detergent (nonylphenol polyethenoxyethanol) and the quaternary ammonium germicide (Onyx BTC 2125) were then mixed and added to the above-described solution, and the solution mixed until clear. The combination of thickeners was then added. The color solution was then added.

With continued mixing, the pH was adjusted by 25% sulfuric acid to a pH of 10.5 plus or minus 0.3.

*Example II*

The process as described in Example I was carried out except that for the long-chain quaternary ammonium salt used for thickening the composition, the propargyl chloride quaternary of N-methyl-N,N di(hydrogenated tallow)amine was employed.

*Example III*

A more concentrated germicidal cleansing fluid for use on floors, walls, furniture, etc., has the following composition:

| | Percent |
|---|---|
| Onyx BTC 2125 (n-alkyl dimethyl benzyl ammonium chloride 25%, n-alkyl dimethyl ethylbenzyl ammonium chloride 25%, water 50%) | 49.0 |
| Nonylphenol polyethenoxyethanol | 22.1 |
| Polyethenoxy diethanolamide of coconut fatty acids | 9.8 |
| Dodecylbenzyl octadecyl dimethyl ammonium chloride | 4.9 |
| Water | 14.2 |
| | 100.0 |

The foregoing composition is viscous (190 cps.) and stable over a wide range of temperatures.

The specific compositions set forth in these examples demonstrate the wide range in concentrations permissible under this invention, and do not limit further extension of the basic principles of our invention to other concentrations as well.

While in the foregoing specification, we have set forth specific compounds and procedural steps in considerable detail, it will be understood that such detail or details may be varied widely by those skilled in the art without departing from the spirit of our invention.

We claim:

1. A germicidal cleansing composition, consisting essentially of about 82.25 parts of water, 5 parts of a germicidal quaternary compound consisting of equal parts of n-alkyl dimethyl benzyl ammonium chloride and n-alkyl dimethyl ethylbenzyl ammonium chloride, said alkyl groups having from 12 to 18 carbon atoms, and about 4½ parts of nonylphenol polyethenoxyethanol, about 2 parts of polyethenoxy diethanolamide derived from coconut fatty acids, about 1 part of a compound selected from the group consisting of the dodecylbenzyl chloride quaternary of N,N-dimethyloctadecylamine, the dodecenyl chloride quaternary of N,N-dimethyloctadecylamine, the propargyl chloride quaternary of N-methyl-N,N di-(hydrogenated tallow) amine, the dodecenyl chloride quaternary of N,N-dimethyldodecylamine, and the dodecylbenzyl chloride quaternary of N-tallow tris-(hydroxyethyl)-trimethylenediamine, about 3 parts of sodium carbonate, and about 2 parts of sodium tripolyphosphate.

2. A germicidal cleaning composition, consisting essentially of about 14.2 parts of water, 49 parts of a germicidal quaternary compound consisting of 25% n-alkyl dimethyl benzyl ammonium chloride, 25% n-alkyl dimethyl ethylbenzyl ammonium chloride, said alkyl groups having from 12 to 18 carbon atoms, and 50% water, about 22.1 parts of nonylphenol polyethenoxyethanol, 9.8 parts of polyethenoxy diethanolamide of coconut fatty acids, and 4.9 parts of a compound selected from the group consisting of the dodecylbenzyl chloride quaternary of N,N-dimethyloctadecylamine, the dodecenyl chloride quaternary of N,N-dimethyloctadecylamine, the propargyl chloride quaternary of N-methyl, N,N di-(hydrogenated tallow) amine, the dodecenyl chloride quaternary of N,N-dimethyldodecylamine, and the dodecylbenzyl chloride quaternary of N-tallow tris-(hydroxyethyl)-trimethylenediamine.

References Cited by the Examiner

UNITED STATES PATENTS

| 2,085,706 | 6/1937 | Schoeller et al. | 260—404 |
| 2,520,381 | 8/1950 | Carnes | 260—404 |
| 2,746,928 | 5/1956 | Darragh et al. | 252—106 |
| 2,831,815 | 4/1958 | Klisch | 252—152 |

FOREIGN PATENTS

| 525,649 | 5/1956 | Canada. |
| 818,361 | 8/1959 | Great Britain. |

OTHER REFERENCES

Lesser: "Soap and Sanitary Chemicals," August 1951, pp. 37–39, 67, 69, 98.

JULIUS GREENWALD, *Primary Examiner.*